US005558041A

United States Patent [19]
Fairall, Jr. et al.

[11] Patent Number: 5,558,041
[45] Date of Patent: Sep. 24, 1996

[54] DISPOSABLE TELESCOPIC CAT LITTER BOX

[76] Inventors: James Fairall, Jr.; Delores Fairall, both of 310 First Ave., N., Lake Wales, Fla. 33853

[21] Appl. No.: 397,625

[22] Filed: Mar. 2, 1995

[51] Int. Cl.$^6$ ........................................ A01K 1/035
[52] U.S. Cl. ........................................ 119/165
[58] Field of Search ............................ 229/101; 119/165, 119/168, 170

[56] References Cited

U.S. PATENT DOCUMENTS

| | | | |
|---|---|---|---|
| 2,827,222 | 3/1958 | Buttery | 229/101 |
| 4,852,796 | 8/1989 | Katzman | 229/125.28 |
| 4,870,924 | 10/1989 | Wolfe | 119/167 |
| 4,986,217 | 1/1991 | Robinson et al. | 119/168 |
| 5,094,188 | 3/1992 | Wolak | 119/168 |
| 5,129,364 | 7/1992 | Pirkle | 119/167 |
| 5,172,652 | 12/1992 | Dobrin et al. | 119/165 |
| 5,178,100 | 1/1993 | Monk | 119/168 |

Primary Examiner—Robert P. Swiatek
Assistant Examiner—Yvonne R. Abbott

[57] ABSTRACT

A disposable telescopic cat litter box comprising a rectangular bottom portion having a bottom surface and an open top, a front wall, a rear wall, a right wall, and a left wall, an opening in the front wall of the bottom portion, a first set of adhesive tabs positioned along the right wall, a second set of adhesive tabs positioned along the left wall; and a top portion having an open bottom and a top surface, a front wall, a rear wall, a right wall, and a left wall, a perforated portion formed in the front wall, a first set of plastic strips positioned along the right wall adapted for engagement with the adhesive tabs of the right wall of the bottom portion, a second set of plastic strips positioned along the left wall adapted for engagement with the adhesive tabs of the left wall of the bottom portion, the top portion telescopically mated with the bottom portion with the perforated portion of the front wall of the top portion aligning with the opening of the front wall of the bottom portion.

6 Claims, 3 Drawing Sheets

DISPOSABLE TELESCOPIC CAT LITTER BOX

BACKGROUND OF THE INVENTION

1. Field of the Invention

The present invention relates to a disposable telescopic cat litter box and more particularly pertains to providing a latrine for cats with a disposable telescopic cat litter box.

2. Description of the Prior Art

The use of cat litter boxes is known in the prior art. More specifically, cat litter boxes heretofore devised and utilized for the purpose of providing a latrine for cats are known to consist basically of familiar, expected and obvious structural configurations, notwithstanding the myriad of designs encompassed by the crowded prior art which have been developed for the fulfillment of countless objectives and requirements.

By way of example, U.S. Patent Des. 310,588 to Valinsky discloses a disposable cat litter box, U.S. Pat. No. 4,998,504 to Ball discloses a disposable pet litter box, U.S. Pat. No. 5,117,781 to Roach discloses a cat litter disposable box container, U.S. Pat. No. 5,129,364 to Pirkle discloses a one-piece disposable cat litter box, and U.S. Pat. No. 5,,144,914 to Giannakopoulos to discloses a disposable kitty litter box.

While these devices fulfill their respective, particular objective and requirements, the aforementioned patents do not describe a disposable telescopic cat litter box that contains a predetermined amount of litter material disposed therein and is extendable for use or retractable for stowage or disposal.

In this respect, the disposable telescopic cat litter box according to the present invention substantially departs from the conventional concepts and designs of the prior art, and in doing so provides an apparatus primarily developed for the purpose of providing a latrine for cats.

Therefore, it can be appreciated that there exists a continuing need for new and improved disposable telescopic cat litter box which can be used for providing a latrine for cats. In this regard, the present invention substantially fulfills this need.

SUMMARY OF THE INVENTION

In the view of the foregoing disadvantages inherent in the known types of cat litter boxes now present in the prior art, the present invention provides an improved disposable telescopic cat litter box. As such, the general purpose of the present invention, which will be described subsequently in greater detail, is to provide a new and improved disposable telescopic cat litter box and method which has all the advantages of the prior art and none of the disadvantages.

To attain this, the present invention essentially comprises, in combination, a rectangular bottom portion having a closed bottom surface and an open top, a front wall, a rear wall, a right wall, and a left wall, a rectangular opening in the front wall, a first set of adhesive tabs positioned along the right wall, a second set of adhesive tabs positioned along the left wall, the bottom portion being constructed from a paper board material; a top portion having an open bottom and a top surface, a front wall, a rear wall, a right wall, and a left wall, an arched and perforated portion formed in the front wall, a first set of plastic strips positioned along the right wall adapted for engagement with the adhesive tabs of the right wall of the bottom portion, a second set of plastic strips positioned along the left wall adapted for engagement with the adhesive tabs of the left wall of the bottom portion, a first set of push-in tabs positioned along the right wall of the top portion, a second set of push-in tabs positioned along the left wall of the top portion, each of the push-in tabs being selectively engagable with the open top of the bottom portion, the top portion being constructed from a paper board material, the top portion telescopically mated with the bottom portion with the arched and perforated portion of the front wall of the top portion aligning with the rectangular opening of the front wall of the bottom portion; the first set of adhesive tabs and the second set of adhesive tabs of the bottom portion adapted for securement with the first set of plastic strips and the second set of plastic strips of the top portion for securing the bottom portion to the top portion when the bottom portion and the top portion are mated, the first set of push-in tabs and the second set of push-in tabs of the top portion adapted for engagement with the open top of the bottom portion for keeping the bottom portion and the top portion in a spaced relationship to one another; a first portion of deodorant impregnated fibers located within the right wall of the top portion and a second portion of deodorant impregnated fibers located within the left wall of the top portion; a first removable plastic strip positioned over the first portion of deodorant impregnated fibers and a second removable plastic strip positioned over the second portion of deodorant impregnated fibers; a granular litter material positioned upon the bottom surface of the bottom portion; and a paper cover overlying the granular litter material, the paper cover being frangibly connected to the walls of the bottom portion for removal thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disposable telescopic cat litter box which has all the advantages of the prior art cat litter boxes and none of the disadvantages.

It is another object of the present invention to provide a new and improved disposable telescopic cat litter box which may be easily and efficiently manufactured and marketed.

It is a further object of the present invention to provide a new and improved disposable telescopic cat litter box which is of durable and reliable construction.

An even further object of the present invention is to provide a new and improved disposable telescopic cat litter box which is susceptible of a low cost of manufacture with regard to both materials and labor, and which accordingly is then susceptible of low prices of sale to the consuming public, thereby making such a disposable telescopic cat litter box economically available to the buying public.

Still yet another object of the present invention is to provide a new and improved disposable telescopic cat litter box which provides in the apparatuses and methods of the prior art some of the advantages thereof, while simultaneously overcoming some of the disadvantages normally associated therewith.

Even still another object of the present invention is to provide a new and improved disposable telescopic cat litter box for providing a latrine for cats.

Lastly, it is an object of the present invention to provide a new and improved telescopic cat litter box comprising a rectangular bottom portion having a closed bottom surface and an open top, a front wall, a rear wall, a right wall, and a left wall, an opening in the front wall of the bottom portion, a first set of adhesive tabs positioned along the right wall, a second set of adhesive tabs positioned along the left wall, the bottom portion being constructed from a paper board material; and a top portion having an open bottom and a top surface, a front wall, a rear wall, a right wall, and a left wall, a perforated portion formed in the front wall, a first set of plastic strips positioned along the right wall adapted for engagement with the adhesive tabs of the right wall of the bottom portion, a second set of plastic strips positioned along the left wall adapted for engagement with the adhesive tabs of the left wall of the bottom portion, the top portion being constructed from a paper board material, the top portion telescopically mated with the bottom portion with the perforated portion of the front wall of the top portion aligning with the opening of the front wall of the bottom portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
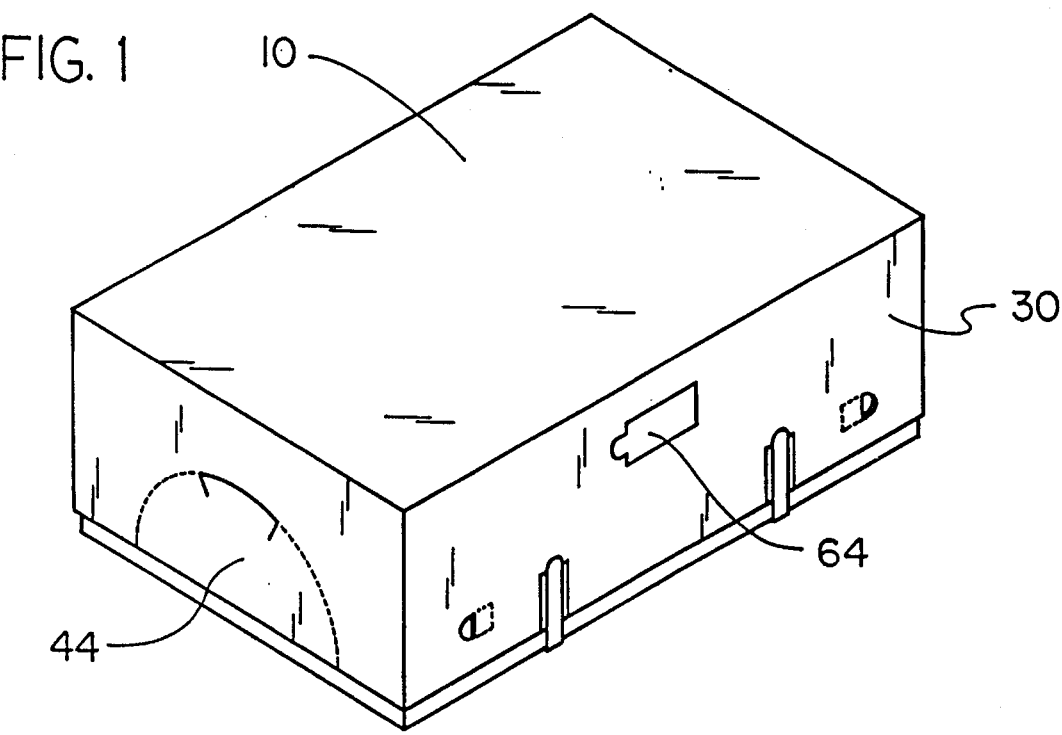
FIG. 1 is a perspective view of the preferred embodiment of the disposable telescopic cat litter box constructed in accordance with the principles of the present invention telescopically retracted for stowage or disposal.
Figure 2:
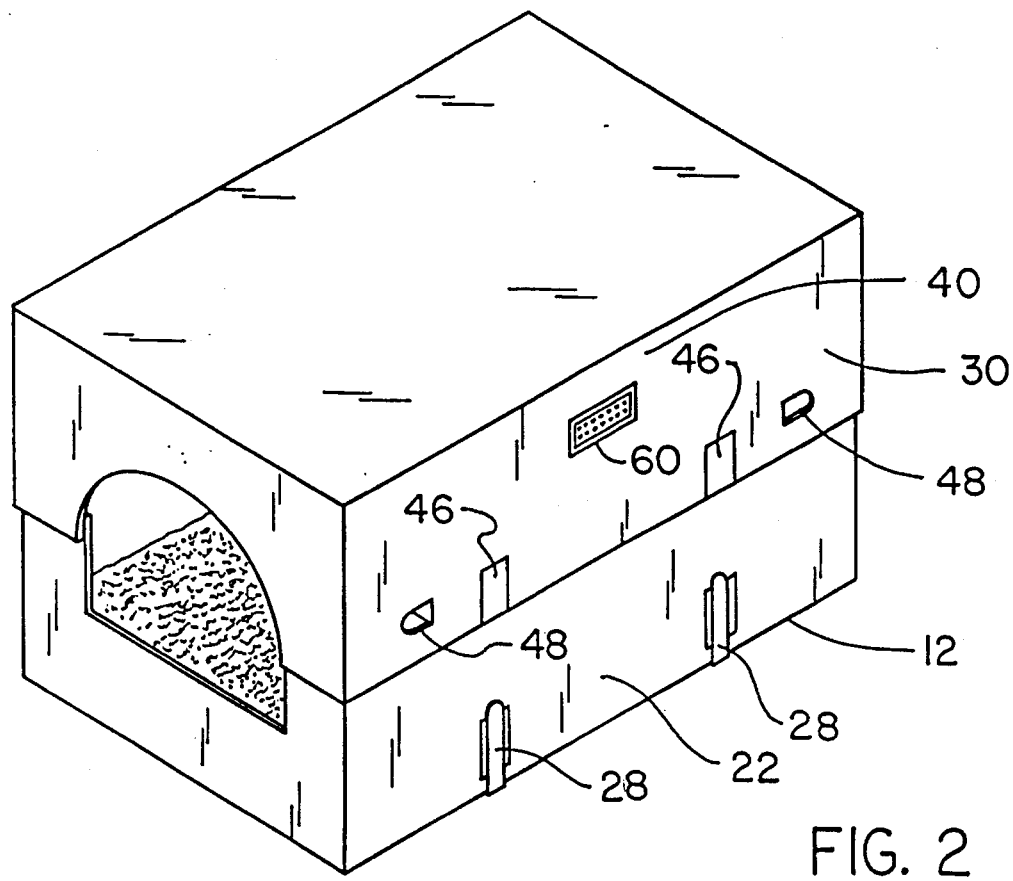
FIG. 2 is a perspective view of the present invention with the arched and perforated portion removed and the top portion telescopically extended for use.
Figure 3:
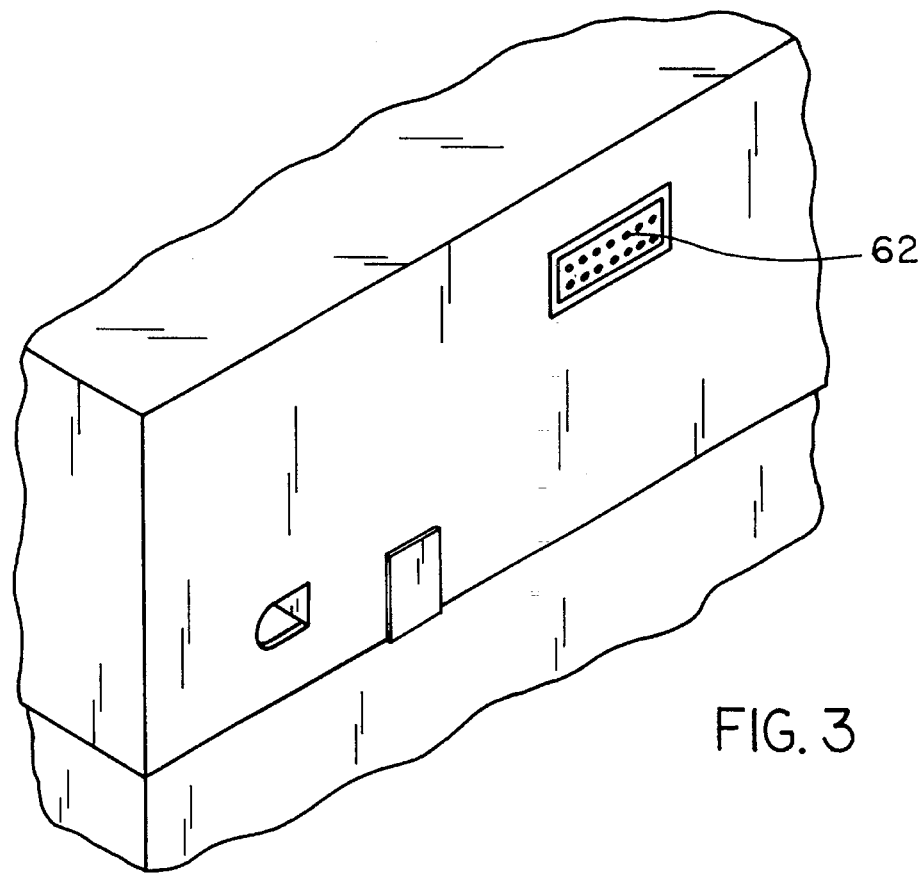
FIG. 3 is an enlarged view of a pushing tab, an adhesive strip, and a deodorant impregnated fiber of the top portion of present invention.
Figure 4:
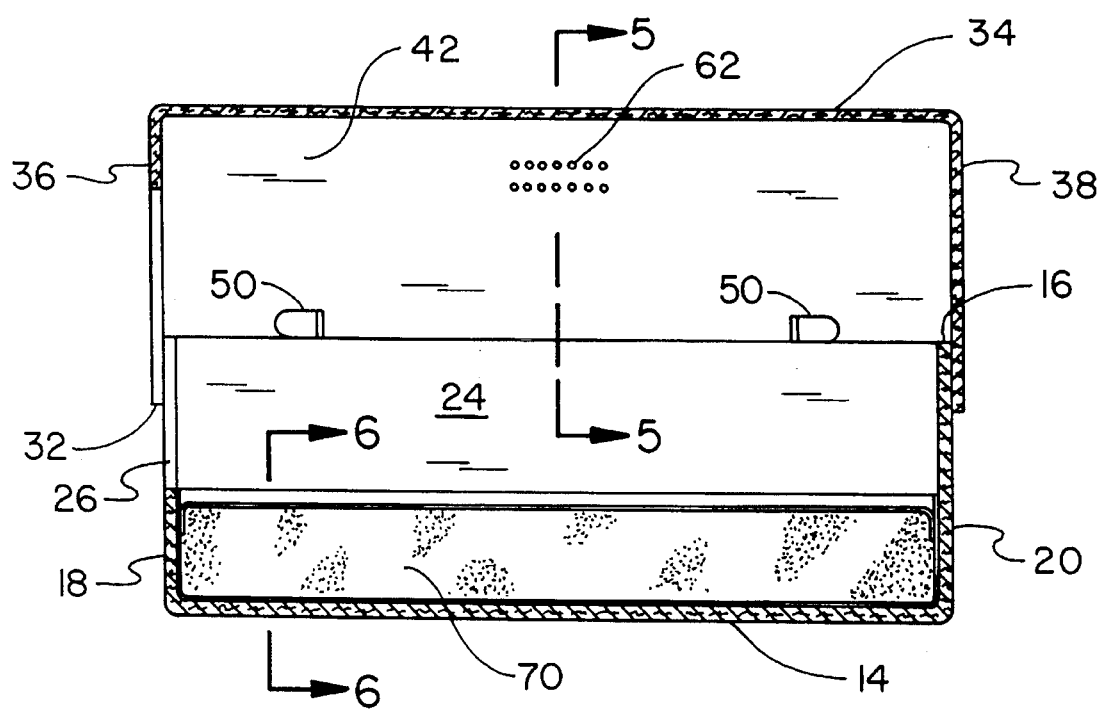
FIG. 4 is a cross sectional view of the present invention.
Figure 5:
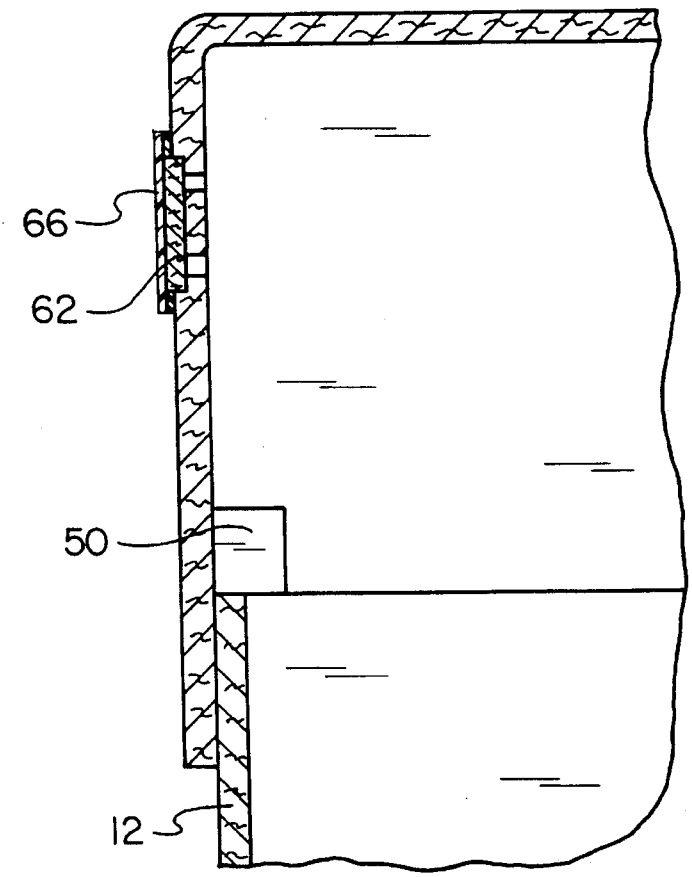
FIG. 5 is an enlarged cross sectional view of a portion of deodorant impregnated fibers; and an engaged push-in tab taken along the line 5—5 of FIG. 4.
Figure 6:
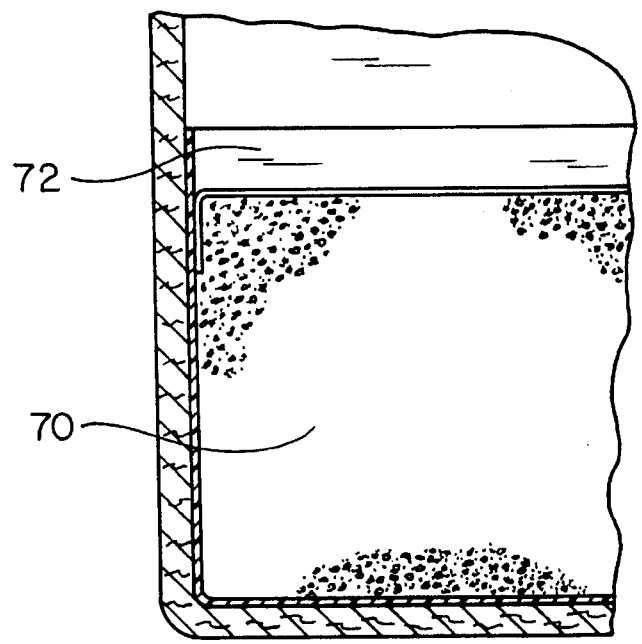
FIG. 6 is an enlarged cross sectional view taken along the line 6—6 of FIG. 4 depicting the litter material in a stowed configuration with the fragible and removable paper cover disposed thereover, The same reference numerals refer to the same parts through the various Figures.

With reference now to the drawings, and in particular, to FIG. 1 thereof, the preferred embodiment of the new and improved disposable telescopic cat litter box embodying the principles and concepts of the present invention and generally designated by the reference number 10 will be described.

Specifically, the present invention includes six major components. The major components are the bottom portion, the top portion, the deodorant impregnated fibers, the plastic strips, the litter material, and the paper cover. These components are interrelated to provide the intended function.

More specifically, it will be noted in the various Figures that the first major component is the bottom portion 12. The bottom portion is constructed from a paper board material. The bottom portion is rectangular and planar in structure. It has a closed bottom surface 14 and an open top 16. The bottom portion has a front wall 18, a rear wall 20, a right wall 22, and a left wall 24 disposed therearound and extending upwards from the bottom surface. The bottom portion also has a rectangular opening 26 disposed on the front wall 18 and positioned adjacent to the open top.

Furthermore, the bottom portion includes two sets of adhesive tabs. The first set of adhesive tabs 28 is coupled and spaced along the right wall and positioned adjacent to the bottom surface. The second set of adhesive tabs is coupled and spaced along the left wall 24 and positioned adjacent to the bottom surface.

The second major component is the top portion 30. The top portion has an open bottom 32 and a top surface 34. The top portion has a front wall 36, a rear wall 38, a right wall 40, and a left wall 42 coupled therearound and extending downwards from the top surface. The top portion also includes an arched and perforated portion 44 formed in the front wall 36. The perforated portion is adapted to be removed to form an arched opening in the front wall.

Furthermore, the top portion includes two sets of plastic strips. The first set of plastic strips 46 is coupled and spaced along the right wall 40 and positioned adjacent to the open bottom. The first set of plastic strips is adapted to be aligned with the first set of adhesive tabs on the right wall 22 of the bottom portion and are adapted to be engaged therewith. A second set of plastic strips is coupled and spaced along the left wall 42 and positioned adjacent to the open bottom. The second set of plastic strips is adapted to be aligned with the second set of adhesive tabs on the left wall 24 of the bottom portion and are adapted to be engaged therewith. The first set of adhesive tabs are secured with the first set of plastic strips and the second set of adhesive tabs are secured with the second set of plastic strips to couple the top portion 30 to the bottom portion 12.

Furthermore, with respect to the top portion, a first set of push-in tabs 48 are formed in and positioned along the right wall 40. A second set of push-in tabs 50 are formed in and positioned along the left wall 42. Each of the push-in tabs is selectively engagable with the opened top 16 of the bottom portion.

The top portion 30 is telescopically mated with the bottom portion 12 such that the arched and perforated portion 44 is aligned with the rectangular opening 26. The first set of push-in tabs and the second set of push-in tabs of the top portion are then engaged with the opened top of the bottom portion to keep the bottom portion and the top portion in a spaced relationship. The perforated portion is removable to define an opening between the top portion and bottom portion for allowing a cat to access the litter box.

The third major component is the deodorant impregnated fibers. A first portion 60 of deodorant impregnated fibers is located within the right wall 40 of the top portion. A second portion 62 of deodorant impregnated fibers is located within the left wall 42 of the top portion. The fibers are adapted to deodorize the air contained within the litter box.

The fourth major component is the plastic strips. A first removable plastic strip 64 is positioned over the first portion 60 of deodorant impregnated fibers. A second removable plastic strip 66 is positioned over the second portion 62 of deodorant impregnated fibers. The strips are adapted to contain the deodorant within the impregnated fibers when the litter box is placed in a stowed configuration or when a user elects not to utilize the deodorant.

The fifth major component is the litter material 70. The litter material is positioned upon the bottom surface 14 of the bottom portion. The litter is adapted to contain the urine and feces of a cat within the bottom portion of the litter box. The litter material is conventional in structure and is commercially available.

The sixth major component is the paper cover 72. The paper cover is disposed within the litter box overlying the granular litter material. The paper cover is fragibly and removably connected to the walls of the bottom portion. The paper cover is used to place the litter material in a stowed configuration. A user is able to place the litter box in a operable configuration by removing the paper cover, whereby exposing the litter material for use by a cat.

In the preferred embodiment, the major components are conventional in design and commercially available. The present invention can be used by any animal trained to use a litter box. Initially, the litter box is placed in a stowed configuration with the arched and perforated portion attached and the paper disposed over the litter material. To place the present invention in an operable configuration, a user extends the top portion from the bottom portion, pushes the tabs inward to place the top portion in a spaced configuration from the bottom portion, removes the arched and perforated portion, and then removes the paper cover from the litter material. To return the present invention to the stowed configuration, a user pulls the tabs outwards and then retracts the top portion towards the bottom portion, whereby sealing the opening into the litter box. A user may then secure the adhesive tabs to the plastic strips to store or dispose of the litter box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A disposable telescopic cat litter box comprising, in combination:

a rectangular bottom portion having a closed bottom surface and an open top, a front wall, a rear wall, a right wall, and a left wall, a rectangular opening in the front wall, a first set of adhesive tabs positioned along the right wall, a second set of adhesive tabs positioned along the left wall, the bottom portion being constructed from a paper board material;

a top portion having an open bottom and a top surface, a front wall, a rear wall, a right wall, and a left wall, an arched and perforated portion formed in the front wall, a first set of plastic strips positioned along the right wall adapted for engagement with the adhesive tabs of the right wall of the bottom portion, a second set of plastic strips positioned along the left wall adapted for engagement with the adhesive tabs of the left wall of the bottom portion, a first set of push-in tabs positioned along the right wall of the top portion, a second set of push-in tabs positioned along the left wall of the top portion, each of the push-in tabs being selectively engagable with the open top of the bottom portion, the top portion being constructed from a paper board material, the top portion telescopically mated with the bottom portion with the arched and perforated portion of the front wall aligning with the rectangular opening of the front wall of the bottom portion;

the first set of adhesive tabs and the second set of adhesive tabs of the bottom portion adapted for securement with the first set of plastic strips and the second set of plastic strips of the top portion for securing the bottom portion to the top portion when the bottom portion and the top portion are mated, the first set of push-in tabs and the second set of push-in tabs of the top portion adapted for engagement with the open top of the bottom portion for keeping the bottom portion and the top portion in a spaced relationship to one another;

a first portion of deodorant impregnated fibers located within the right wall of the top portion and a second portion of deodorant impregnated fibers located within the left wall of the top portion;

a first removable plastic strip positioned over the first portion of deodorant impregnated fibers and a second removable plastic strip positioned over the second portion of deodorant impregnated fibers;

a granular litter material positioned upon the bottom surface of the bottom portion; and a paper cover overlying the granular litter material, the paper cover being frangibly connected to the walls of the bottom portion for removal thereof.

2. A disposable telescopic cat litter box comprising, in combination:

a rectangular bottom portion having a bottom surface and an open top, a front wall, a rear wall, a right wall, and a left wall, a u-shaped rectangular opening in the front wall of the bottom portion, a first set of adhesive tabs positioned along the right wall, a second set of adhesive tabs positioned along the left wall; and a top portion having an open bottom and a top surface, a front wall, a rear wall, a right wall, and a left wall, a perforated portion formed in the front wall, a first set of plastic strips positioned along the right wall adapted for engagement with the adhesive tabs of the right wall of the bottom portion, a second set of plastic strips positioned along the left wall adapted for engagement with the adhesive tabs of the left wall of the bottom portion, the top portion telescopically mated with the bottom portion with the perforated portion of the front wall of the top portion aligning with the opening of the front wall of the bottom portion.

3. The disposable telescopic cat litter box as described in claim 2 further comprising coupling means for securing the bottom portion to the top portion.

4. The disposable telescopic cat litter box as described in claim 2 further comprising deodorizing means for deodorizing the area in and around the telescopic cat litter box.

5. The disposable telescopic cat litter box as described in claim 2 further comprising spacing means for placing the top portion and the bottom portion in a spaced relationship.

6. The disposable telescopic cat litter box as described in claim 2 further comprising:

a litter material positioned upon the bottom surface of the bottom portion; and a removable cover overlying the litter material.

* * * * *